US012475622B2

(12) United States Patent
Kumar et al.

(10) Patent No.: US 12,475,622 B2
(45) Date of Patent: Nov. 18, 2025

(54) DIGITAL CONTENT ANALYSIS

(71) Applicant: Adobe Inc., San Jose, CA (US)

(72) Inventors: Yaman Kumar, New Delhi (IN);
Somesh Singh, Lucknow (IN);
Seoyoung Park, San Francisco, CA
(US); Pranjal Prasoon, Ranchi (IN);
Nithyakala Sainath, Chennai (IN);
Nisarg Shailesh Joshi, Mumbai (IN);
Nikitha Srikanth, Mysore (IN);
Nikaash Puri, New Delhi (IN); Milan
Aggarwal, Pitampura (IN); Jayakumar
Subramanian, Mumbai (IN); Ganesh
Palwe, Bangalore (IN); Balaji
Krishnamurthy, Noida (IN); Matthew
William Rozen, San Francisco, CA
(US); Mihir Naware, Redwood City,
CA (US); Hyman Chung, San Ramon,
CA (US)

(73) Assignee: Adobe Inc., San Jose, CA (US)

(*) Notice: Subject to any disclaimer, the term of this patent is extended or adjusted under 35 U.S.C. 154(b) by 165 days.

(21) Appl. No.: 18/304,534

(22) Filed: Apr. 21, 2023

(65) Prior Publication Data
US 2024/0355020 A1  Oct. 24, 2024

(51) Int. Cl.
G09G 5/00   (2006.01)
G06N 20/20  (2019.01)
G06T 11/60  (2006.01)

(52) U.S. Cl.
CPC .............. G06T 11/60 (2013.01); G06N 20/20 (2019.01)

(58) Field of Classification Search
CPC ......... G06T 11/60; G06T 19/00; G06T 11/00;
G06T 11/20; G06T 11/206; G06T 7/0012;
G06T 2207/10081; G06T 2207/30004;
G06F 9/4443; G06F 3/0481; G06F 30/13;
G06F 3/04845; G06F 3/04883; G06F
40/143; G06F 16/54; G06F 16/56; G06F
16/5838; G06V 20/20; G06V 10/7753;
(Continued)

(56) References Cited

U.S. PATENT DOCUMENTS 8,510,644 B2   8/2013 Rajkumar et al.
9,760,631 B1   9/2017 Broxton et al.
(Continued)

OTHER PUBLICATIONS

U.S. Appl. No. 18/133,725, filed Dec. 27, 2023, "Notice of Allowance", U.S. Appl. No. 18/133,725, filed Dec. 27, 2023, 11 pages.
(Continued)

Primary Examiner — Gordon G Liu
(74) Attorney, Agent, or Firm — FIG. 1 Patents

(57) ABSTRACT

In implementations of systems for digital content analysis, a computing device implements an analysis system to extract a first content component and a second content component from digital content to be analyzed based on content metrics. The analysis system generates first embeddings using a first machine learning model and second embedding using a second machine learning model. The first embeddings and the second embeddings are combined as concatenated embeddings. The analysis system generates an indication of a content metric for display in a user interface using a third machine learning model based on the concatenated embeddings.

20 Claims, 16 Drawing Sheets

(58) Field of Classification Search
CPC .. G11B 27/10; H04N 21/47217; G16H 30/20; G06N 20/20; G06N 3/045
USPC ........................................................ 345/619
See application file for complete search history.

(56) References Cited

U.S. PATENT DOCUMENTS

| | | | |
|---|---|---|---|
| 9,904,661 | B2 | 2/2018 | Gorelik et al. |
| 10,466,869 | B2 | 11/2019 | Liu |
| 10,909,604 | B1 | 2/2021 | Zappella |
| 11,392,751 | B1 | 7/2022 | Szarvas et al. |
| 11,907,508 | B1 | 2/2024 | Kumar et al. |
| 12,124,683 | B1 | 10/2024 | Kumar et al. |
| 2013/0179217 | A1 | 7/2013 | Newton |
| 2015/0302755 | A1 | 10/2015 | Breck et al. |
| 2016/0103904 | A1 | 4/2016 | Greenberg et al. |
| 2016/0171511 | A1 | 6/2016 | Goel et al. |
| 2017/0070785 | A1 | 3/2017 | Zou |
| 2017/0140249 | A1 | 5/2017 | Lee et al. |
| 2020/0107072 | A1* | 4/2020 | Lomada ............... G06N 3/084 |
| 2020/0360794 | A1 | 11/2020 | Intonato et al. |
| 2021/0004670 | A1* | 1/2021 | Tripathi ............... G06N 3/084 |
| 2021/0019567 | A1 | 1/2021 | Gandhi et al. |
| 2021/0073583 | A1 | 3/2021 | Dagan et al. |
| 2021/0081470 | A1 | 3/2021 | Fisher et al. |
| 2021/0089570 | A1 | 3/2021 | Hunter et al. |
| 2021/0117736 | A1 | 4/2021 | Merler et al. |
| 2021/0209425 | A1 | 7/2021 | Nataraj et al. |
| 2021/0281650 | A1 | 9/2021 | George et al. |
| 2021/0373726 | A1 | 12/2021 | Boyd et al. |
| 2022/0027176 | A1 | 1/2022 | Mclachlan et al. |
| 2022/0036064 | A1* | 2/2022 | Wang .................. G06V 40/30 |
| 2022/0114207 | A1 | 4/2022 | Kawabata et al. |
| 2022/0114326 | A1 | 4/2022 | Bedi et al. |
| 2022/0198951 | A1 | 6/2022 | Carroll et al. |
| 2023/0070390 | A1 | 3/2023 | Weng et al. |
| 2023/0188792 | A1 | 6/2023 | Sahasi et al. |
| 2023/0325944 | A1 | 10/2023 | Dejoux et al. |
| 2024/0104338 | A1* | 3/2024 | Gong .................. G06N 3/045 |
| 2024/0177512 | A1* | 5/2024 | Gils ..................... G06F 40/169 |
| 2024/0345707 | A1 | 10/2024 | Kumar et al. |
| 2024/0362821 | A1 | 10/2024 | Srivastav et al. |

OTHER PUBLICATIONS

"Colour metric", Thiadmer Riemersma, CompuPhase [retrieved 2023-04-24]. Retrieved from the Internet <https://www.compuphase.com/cmetric.htm>., May 23, 2019, 5 Pages.

"Earn for your writing", Medium [retrieved Dec. 1, 2022]. Retrieved from the Internet <https://medium.com/earn>., 4 Pages.

"medium.com SEO Analysis & Statistics", SEOMoz, Inc. [retrieved Dec. 1, 2022]. Retrieved from the Internet <https://moz.com/domain-analysis/medium.com>., 5 Pages.

"Sensational Color", Kate Smith LLC [retrieved Apr. 24, 2023]. Retrieved from the Internet <https://www.sensationalcolor.com/color-temperature/>., 9 Pages.

"Twitter Usage Statistics", Internet Live Stats [retrieved Jun. 12, 2022]. Retrieved from the Internet <https://www.internetlivestats.com/twitter-statistics/>., 8 Pages.

"What is Medium", Medium [retrieved Dec. 1, 2022]. Retrieved from the Internet <https://medium.com/about>., 6 Pages.

"You Tube for Press", Youtube Official Blog [retrieved Dec. 6, 2022]. Retrieved from the Internet <https://blog.youtube/press/>., 11 Pages.

Athey, Susan , "Beyond prediction: Using big data for policy problems", Science, vol. 355, No. 6324 [retrieved Dec. 1, 2022]. Retrieved from the Internet <https://scholar.harvard.edu/files/people_analytics/files/beyond_prediction.pdf>., Feb. 2017, 4 Pages.

Bandari, Roja et al., "The Pulse of News in Social Media: Forecasting Popularity", Cornell University arXiv, arXiv.org [retrieved Dec. 1, 2022]. Retrieved from the Internet <https://arxiv.org/pdf/1202.0332.pdf>., Feb. 2, 2012, 8 Pages.

Beltagy, Iz et al., "Longformer: The Long-Document Transformer", Cornell University arXiv, arXiv.org [retrieved Dec. 1, 2022]. Retrieved from the Internet <https://arxiv.org/pdf/2004.05150.pdf>., Dec. 2, 2020, 17 Pages.

Botticello, Casey , "How Much Money Can You Make Writing for Medium?", Blogging Guide [retrieved Dec. 1, 2022]. Retrieved from the Internet <https://medium.com/blogging-guide/how-much-money-can-you-make-writing-for-medium-a3cf0c9c7533>., Aug. 18, 2018, 24 Pages.

Callegaro, Mario et al., "The role of surveys in the era of "big data"", in: The Palgrave handbook of Survey Research, Palgrave Macmillan [retrieved Dec. 1, 2022]. Retrieved from the Internet <https://doi.org/10.1007/978-3-319-54395-6>., Jan. 22, 2018, 19 Pages.

Edwards, Jim , "$132 million later, Ev Williams says he is raising even more money for Medium", Business Insider India [online] [retrieved Dec. 1, 2022]. Retrieved from the Internet <https://www.businessinsider.in/lyft-removed-the-option-to-split-ride-fares-with-other-passengers-but-says-an-easier-option-is-coming-soon/articleshow/66548306.cms>., Nov. 9, 2018, 35 Pages.

Egami, Naoki et al., "How to Make Causal Inferences Using Texts", Cornell University arXiv, arXiv.org [retrieved Dec. 1, 2022]. Retrieved from the Internet <https://arxiv.org/pdf/1802.02163.pdf>., Feb. 6, 2018, 47 Pages.

Feng, Jean et al., "Sparse-Input Neural Networks for High-dimensional Nonparametric Regression and Classification", Cornell University arXiv, arXiv.org [retrieved Dec. 1, 2022]. Retrieved from the Internet <https://arxiv.org/pdf/1711.07592.pdf>., Jun. 21, 2019, 37 Pages.

Gangl, Markus , "Causal inference in sociological research", Annual Review of Sociology, vol. 36 [retrieved Dec. 13, 2022]. Retrieved from the Internet <https://doi.org/10.1146/annurev.soc.012809.102702>., Oct. 2010, 30 Pages.

Gelli, Francesco et al., "Image Popularity Prediction in Social Media Using Sentiment and Context Features", MM '15: Proceedings of the 23rd ACM international conference on Multimedia [retrieved Dec. 1, 2022]. Retrieved from the Internet <https://asset-pdf.scinapse.io/prod/2090059852/2090059852.pdf>., Oct. 13, 2015, 4 Pages.

Hagar, Nick et al., "Optimizing Content with A/B Headline Testing: Changing Newsroom Practices", Media and Communication, vol. 7, No. 1 [retrieved Dec. 1, 2022]. Retrieved from the Internet <https://pdfs.semanticscholar.org/f3fb/92658537d7a6c5a552300fd0ff70366b6941.pdf>., Feb. 19, 2019, 11 Pages.

Hair, Joseph et al., "Data, measurement, and causal inferences in machine learning: opportunities and challenges for marketing", Journal of Marketing Theory and Practice vol. 29 [retrieved Dec. 1, 2022]. Retrieved from the Internet <https://doi.org/10.1080/10696679.2020.1860683>., Jan. 11, 2021, 13 Pages.

Hessel, Jack et al., "Something's Brewing! Early Prediction of Controversy-causing Posts from Discussion Features", Cornell University arXiv, arXiv.org [retrieved Dec. 1, 2022]. Retrieved from the Internet <https://arxiv.org/pdf/1904.07372.pdf>., May 14, 2019, 12 Pages.

Hofman, Jake et al., "Integrating explanation and prediction in computational social science", Nature, vol. 595 [retrieved Dec. 1, 2022]. Retrieved from the Internet <http://www.eliassi.org/explanation-vs- prediction.pdf>., Jun. 30, 2021, 8 Pages.

Hofman, Jake et al., "Prediction and explanation in social systems", Science, vol. 355, No. 6324 [retrieved Dec. 1, 2022]. Retrieved from the Internet <http://faculty.washington.edu/jwilker/559/prediction.pdf>., Feb. 3, 2017, 4 Pages.

Holland, Paul , "Statistics and causal inference", Journal of the American Statistical Association, vol. 81 [retrieved Dec. 1, 2022]. Retrieved from the Internet <http://www.fitelson.org/woodward/holland.pdf>., Mar. 12, 2012, 16 Pages.

Holliman, Geraint et al., "Business to business digital content marketing: marketers' perceptions of best practice", Journal of Research in Interactive Marketing [retrieved Dec. 1, 2022]. Retrieved from the Internet <https://e-space.mmu.ac.uk/579029/2/B2BContentMarketingJRIMREV11052014editsoffSUB.pdf>., Oct. 7, 2014, 32 Pages.

(56) References Cited

OTHER PUBLICATIONS

Howard, Rob, "I just made $76 writing for Medium members. Here's what I learned . . . ", Medium [online] [retrieved Dec. 1, 2022]. Retrieved from the Internet <https://medium.com/the-mission/i-just-made-76-writing-for-medium-members-heres-what-i-learned-9cbb85abfc36>., Sep. 11, 2017, 5 Pages.

Huang, Jianyi, "Predicting the active period of popularity evolution: A case study on Twitter hashtags", Information Sciences, vol. 512 [retrieved Dec. 13, 2022]. Retrieved from the Internet <https://doi.org/10.1016/j.ins.2019.04.028>., Feb. 1, 2020, 12 Pages.

Huang, Ming-Hui et al., "A strategic framework for artificial intelligence in marketing", Journal of the Academy of Marketing Science, vol. 49, No. 1 [retrieved Dec. 1, 2022]. Retrieved from the Internet <10.1007/s11747-020-00749-9>., Jan. 2021, 22 Pages.

Hulland, John et al., "Marketing survey research best practices: evidence and recommendations from a review of JAMS articles", Journal of the Academy of Marketing Science [retrieved Dec. 1, 2022]. Retrieved from the Internet <http://www.personal.psu.edu/jxb14/IPSS/materials/Hullandetal2017.pdf>., Apr. 10, 2017, 17 Pages.

Hünermund, Paul et al., "Causal Machine Learning and Business Decision Making", [retrieved Dec. 1, 2022]. Retrieved from the Internet <https://papers.ssrn.com/sol3/papers.cfm?abstract_id=3867326>., Feb. 19, 2022, 52 Pages.

Hutto, C et al., "Vader: A Parsimonious Rule-Based Model for Sentiment Analysis of Social Media Text", vol. 8 No. 1 (2014): Eighth International AAAI Conference on Weblogs and Social Media [retrieved Dec. 1, 2022]. Retrieved from the Internet <https://ojs.aaai.org/index.php/ICWSM/article/view/14550/14399>., May 16, 2014, 10 Pages.

Imbens, Guido et al., "Causal Inference for Statistics, Social, and Biomedical Sciences", Cambridge University Press, New York [retrieved Dec. 1, 2022]. Retrieved from the Internet <https://wiki.swarma.org/images/5/54/-Guido_W._Imbens%2C_Donald_B._Rubin-_Causal_Inferenc%28z-lib.org%29.pdf>., 2015, 646 Pages.

Joo, Jungseock et al., "Automated Facial Trait Judgment and Election Outcome Prediction: Social Dimensions of Face", IEEE International Conference on Computer Vision (ICCV) [retrieved Dec. 1, 2022]. Retrieved from the Internet <http://www.stat.ucla.edu/~sczhu/papers/Conf_2015/face_trait_ICCV15.pdf>., Dec. 7, 2015, 9 Pages.

Keuschnigg, Marc et al., "Analytical sociology and computational social science", Journal of Computational Social Science, vol. 1, No. 1 [retrieved Dec. 1, 2022]. Retrieved from the Internet <https://asset-pdf.scinapse.io/prod/2768731445/2768731445.pdf>., Feb. 12, 2018, 12 Pages.

Koç, Ali Aydin et al., "A comparative study of Artificial Neural Networks and Logistic Regression for classification of marketing campaign results", Mathematical and Computational Applications, vol. 18, No. 3 [retrieved Dec. 1, 2022]. Retrieved from the Internet <https://pdfs.semanticscholar.org/eca3/aab293fbe911ce8b9a8af7bf6431e695c398.pdf>., 2013, 7 Pages.

Koch, Bernard et al., "Deep Learning of Potential Outcomes", Cornell University arXiv, arXiv.org [retrieved Dec. 1,2 022]. Retrieved from the Internet <https://arxiv.org/pdf/2110.04442.pdf>., Oct. 9, 2021, 51 Pages.

Koiso-Kanttila, Nina, "Digital Content Marketing: A Literature Synthesis", Journal of Marketing Management vol. 20 [retrieved Dec. 13, 2022]. Retrieved from the Internet <https://doi.org/10.1362/026725704773041122>., Aug. 9, 2010, 23 Pages.

Kumar, Yaman et al., "US Application as Filed", U.S. Appl. No. 18/304,534, filed Apr. 21, 2023, 61 pages.

Kumar, Yaman et al., "US Application as Filed", U.S. Appl. No. 18/133,725, 04/12/20230, 73 pages.

Ma, Liye et al., "Machine learning and AI in marketing—Connecting computing power to human insights", International Journal of Research in Marketing, vol. 37, No. 3 [retrieved Dec. 1, 2022]. Retrieved from the Internet <https://www.ckgsb.edu.cn/uploads/professor/202008/14/Ma_Sun_2020.pdf>., Aug. 2020, 24 Pages.

Moniz, Nuno et al., "A review on web content popularity prediction: Issues and open challenges", Online Social Networks and Media, vol. 12 [retrieved Dec. 1, 2022]. Retrieved from the Internet <doi.org/10.1016/j.osnem.2019.05.002>., https://www.researchgate.net/profile/Nuno-Moniz/publication/333728102_A_Review_on_Web_Content_Popularity_Prediction_Issues_and_Open_Challenges/links/5d00ffb9a6fdccd13095860d/A-Review-on-Web-Content-Popularity-Prediction-Issues-and-Open-Challenges.pdf, Jun. 12, 2019, 57 Pages.

Obermeyer, Ziad, "Dissecting racial bias in an algorithm used to manage the health of populations", Science, vol. 366, No. 6464 [retrieved Dec. 1, 2022]. Retrieved from the Internet <https://www.snowdropsolution.com/pdf/Dissecting%20Racial%20Bias%20In%20An%20Algorithm%20Used%20To%20Manage%20The%20Health%20Of%20Populations.pdf>., Oct. 2019, 8 Pages.

Opreana, Alin et al., "A New Development in Online Marketing: Introducing Digital Inbound Marketing", Expert Journal of Marketing, vol. 3, No. 1 [retrieved Dec. 1, 2022]. Retrieved from the Internet <https://marketing.expertjournals.com/ark:/16759/EJM_305opreana29-34.pdf>, Aug. 10, 2015, 6 Pages.

Pearl, Judea, "Causality", Cambridge University Press, New York, NY [retrieved Dec. 7, 2022]. Retrieved from the Internet <https://doi.org/10.1017/CBO9780511803161>., Mar. 2000, 200 Pages.

Petrovic, Sasa et al., "RT to Win! Predicting Message Propagation in Twitter", In International Conference on Weblogs and Social Media (ICWSM) [retrieved Dec. 5, 2022]. Retrieved from the Internet <http://cs.wellesley.edu/~trails/retweetpapers/papers/RTToWin.pdf>., May 11, 2011, 4 pages.

Pinto, Henrique et al., "Using early view patterns to predict the popularity of youtube videos", WSDM '13: Proceedings of the sixth ACM international conference on Web search and data mining [retrieved Dec. 5, 2022]. Retrieved from the Internet <https://doi.org/10.1145/2433396.2433443>., https://www.researchgate.net/profile/Marcos-Goncalves-9/publication/266653405_Using_early_view_patterns_to_predict_the_popularity_of_YouTube_videos/links/54b7a2e30cf2bd04be33b2b3/Using-early-view-patterns-to-predict-the-popularity-of-YouTube-videos.pdf, Feb. 4, 2013, 10 Pages.

Proskurnia, Julia et al., "Predicting the Success of Online Petitions Leveraging Multidimensional Time-Series", WWW '17: Proceedings of the 26th International Conference on World Wide Web [retrieved Dec. 5, 2022]. Retrieved from the Internet <https://exascale.info/assets/pdf/www_2017_p755.pdf>., Apr. 3, 2017, 10 Pages.

Pryor, J.J., "How Many Stories Are Published on Medium Each Month?", Medium [online] [retrieved Dec. 5, 2022]. Retrieved from the Internet <https://medium.com/feedium/how-many-stories-are-published-on-medium-each-month-fe4abb5c2ac0>., Sep. 14, 2020, 10 Pages.

Pryzant, Reid et al., "Interpretable Neural Architectures for Attributing an Ad's Performance to its Writing Style", Proceedings of the 2018 EMNLP Workshop BlackboxNLP: Analyzing and Interpreting Neural Networks for NLP [retrieved Dec. 6, 2022]. Retrieved from the Internet <https://aclanthology.org/W18-5415.pdf>., Nov. 2018, 11 Pages.

Radford, Alec et al., "Learning Transferable Visual Models From Natural Language Supervision", Cornell University arXiv, arXiv.org [retrieved Jun. 29, 2023]. Retrieved from the Internet <https://arxiv.org/pdf/2103.00020.pdf>., Feb. 26, 2021, 48 Pages.

Robert, Rose et al., "Managing Content Marketing: The Real-World Guide for Creating Passionate Subscribers to Your Brand", Content Marketing Institute [retrieved Jan. 11, 2023]. Retrieved from the Internet <https://books.google.com/books/about/Managing_Content_Marketing.html?id=PiPgXwAACAAJ>., Aug. 29, 2011, 209 Page.

Rubin, Donald, "Causal Inference Using Potential Outcomes: Design, Modeling, Decisions", Journal of the American Statistical Association, American Statistical Association, vol. 100 [retrieved Dec. 6, 2022]. Retrieved from the Internet <http://www.stat.unipg.it/stanghellini/rubinjasa2005.pdf>., Mar. 2005, 10 Pages.

Rubin, Donald, "Estimating causal effects of treatments in randomized and nonrandomized studies", Journal of Educational Psychology, vol. 66, No. 5 [retrieved Dec. 6, 2022]. Retrieved from the Internet <https://web.archive.org/web/20190224065551id_/http://

(56) References Cited

OTHER PUBLICATIONS pdfs.semanticscholar.org/5451/22e2990590524459ec9b59ccac6ce71e3b6a.pdf>., Oct. 1974, 14 Pages.

Runge, Jakob et al., "Escaping the curse of dimensionality in estimating multivariate transfer entropy", Physical Review Letters [retrieved Dec. 6, 2022]. Retrieved from the Internet <https://www.pik-potsdam.de/members/kurths/publikationen/2012/rungeprl108.pdf>., Jun. 2012, 5 Pages.

Shrikumar, Avanti, "Not Just a Black Box: Learning Important Features Through Propagating Activation Differences", Cornell University arXiv, arXiv.org [retrieved Dec. 6, 2022]. Retrieved from the Internet <https://arxiv.org/pdf/1605.01713.pdf>., Apr. 11, 2017, 6 Pages.

Srivastav, Nimish et al., "US Application as Filed", U.S. Appl. No. 18/140,543, filed Apr. 27, 2023, 53 pages.

Sundararajan, Mukund et al., "Axiomatic Attribution for Deep Networks", Proceedings of the 34th International Conference on Machine Learning [retrieved Dec. 6, 2022]. Retrieved from the Internet <https://mit6874.github.io/assets/misc/sundararajan.pdf>., Jun. 13, 2017, 11 pages.

Talebi, Hossein et al., "NIMA: Neural Image Assessment", Cornell University arXiv, arXiv.org [retrieved Dec. 6, 2022]. Retrieved from the Internet <https://arxiv.org/pdf/1709.05424.pdf>., Apr. 26, 2018, 15 Pages.

Tang, Xiangyun et al., "Fully Exploiting Cascade Graphs for Real-time Forwarding Prediction", AAAI Technical Track on Application Domains vol. 35 No. 1 [retrieved Dec. 6, 2022]. Retrieved from the Internet <https://ojs.aaai.org/index.php/AAAI/article/view/16137>., May 18, 2021, 9 Pages.

Tank, Alex et al., "Neural Granger Causality", Cornell University arXiv, arXiv.org [retrieved Dec. 6, 2022]. Retrieved from the Internet <https://arxiv.org/pdf/1802.05842.pdf>., Mar. 13, 2021, 14 Pages.

Tatar, Alexandru et al., "A survey on predicting the popularity of web content", Journal of Internet Services and Applications vol. 5, No. 1 [retrieved Dec. 6, 2022]. Retrieved from the Internet <https://jisajournal.springeropen.com/counter/pdf/10.1186/s13174-014-0008-y.pdf>., Mar. 2015, 20 Pages.

Tatar, Alexandru, "Predicting the popularity of online articles based on user comments", Proceedings of the International Conference on Web Intelligence, Mining and Semantics [retrieved Dec. 6, 2022]. Retrieved from the Internet <https://doi.org/10.1145/1988688.1988766>., May 25, 2011, 8 Pages.

Varian, Hal, "Causal inference in economics and marketing", Proceedings of the National Academy of Sciences of the United States of America [retrieved Dec. 6, 2022]. Retrieved from the Internet <https://cdsbasel.github.io/dataanalytics/assets/pdf/Varian2016.pdf>., May 25, 2016, 6 Pages.

Veitch, Victor et al., "Adapting text embeddings for causal inference", Cornell University arXiv, arXiv.org [retrieved Dec. 6, 2022]. Retrieved from the Internet <https://arxiv.org/pdf/1905.12741.pdf>., Jul. 25, 2020, 10 Pages.

Wager, Stefan et al., "High-dimensional regression adjustments in randomized experiments", Cornell University arXiv, arXiv.org [retrieved Dec. 6, 2022]. Retrieved from the Internet <https://arxiv.org/pdf/1607.06801.pdf>., Oct. 27, 2016, 23 Pages.

Wang, Jiahao et al., "Will You Ever Become Popular? Learning to Predict Virality of Dance Clips", ACM Transactions on Multimedia Computing, Communications, and Applications, vol. 18, No. 2 [retrieved Dec. 6, 2022]. Retrieved from the Internet <https://arxiv.org/pdf/2111.03819.pdf>., Feb. 16, 2022, 23 Pages.

Wang, Tan et al., "Causal attention for unbiased visual recognition", Cornell University arXiv, arXiv.org [retrieved Dec. 6, 2022]. Retrieved from the Internet <https://arxiv.org/pdf/2108.08782.pdf>., Aug. 19, 2021, 18 Pages.

Wood-Doughty, Zach et al., "Challenges of using text classifiers for causal inference", Cornell University arXiv, arXiv.org [retrieved Dec. 6, 2022]. Retrieved from the Internet <https://arxiv.org/pdf/1810.00956.pdf>., Oct. 1, 2018, 13 Pages.

Xie, Jiayi et al., "Micro-video Popularity Prediction via Multimodal Variational Information Bottleneck", IEEE Transactions on Multimedia [retrieved Dec. 13, 2022]. Retrieved from the Internet <https://ieeexplore.ieee.org/abstract/document/9576573>., Oct. 15, 2021, 14 Pages.

Yang, Yang et al., "A named entity topic model for news popularity prediction", Knowledge-Based Systems, vol. 208 [retrieved Dec. 13, 2022]. Retrieved from the Internet <https://www.sciencedirect.com/science/article/abs/pii/S0950705120305591>., Nov. 15, 2020, 12 Pages.

Zhou, Fan, "A survey of information cascade analysis: Models, predictions, and recent advances", ACM Comput. Surv., vol. 54, No. 2 [retrieved Dec. 6, 2022]. Retrieved from the Internet <https://researchain.net/archives/pdfreader/A-Survey-Of-Information-Cascade-Analysis-Models-Predictions-And-Recent-Advances-2229179>., Mar. 24, 2021, 43 Pages.

U.S. Appl. No. 18/409,638, filed Sep. 5, 2024, "Notice of Allowance", U.S. Appl. No. 18/409,638, filed Sep. 5, 2024, 16 pages.

"Non-Final Office Action", U.S. Appl. No. 18/140,543, Aug. 27, 2025, 11 pages.

\* cited by examiner

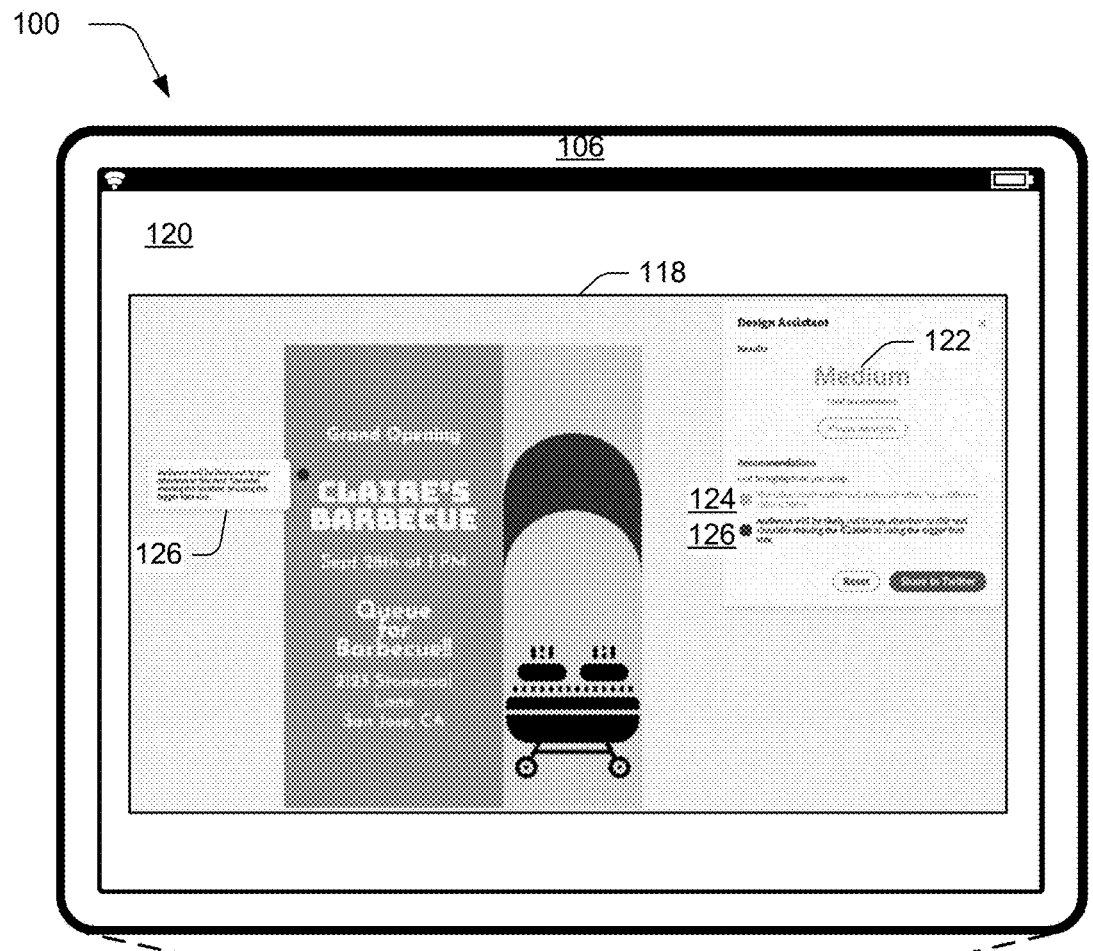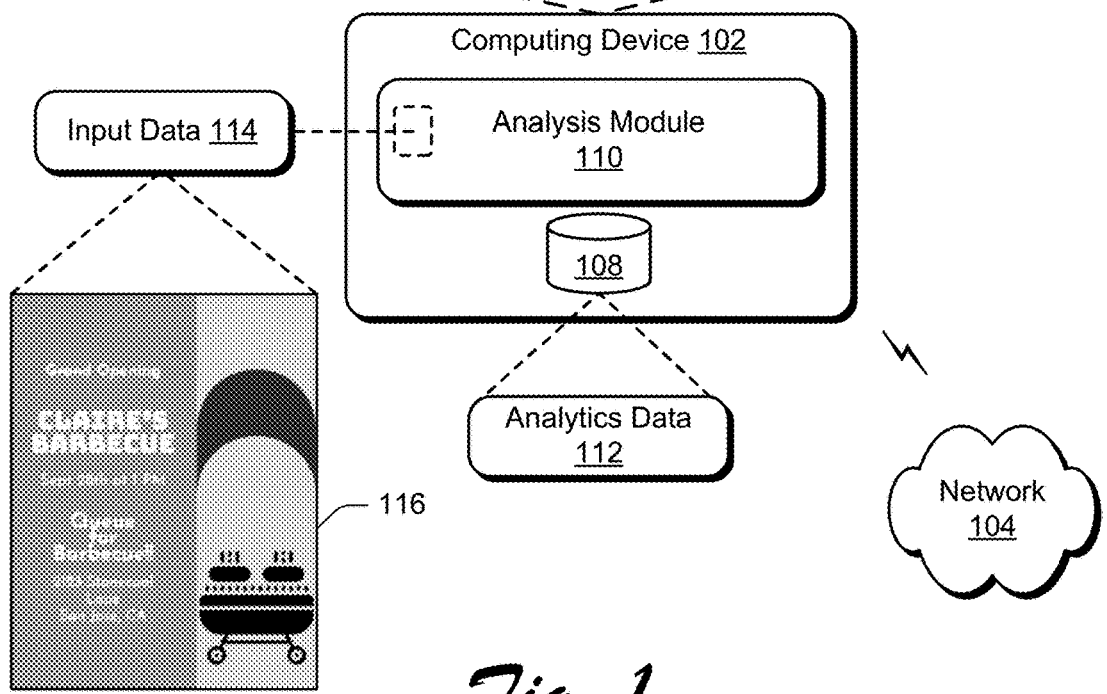
Fig. 1

1100

1102
Extract a first content component and a second content component from digital content to be analyzed based on content metrics

1104
Generate first embeddings by processing the first content component using a first machine learning model and second embeddings by processing the second content component using a second machine learning model

1106
Combine the first embeddings and the second embeddings as concatenated embeddings

1108
Generate an indication of a content metric for display in a user interface using a third machine learning model based on the concatenated embeddings

*Fig. 11*

DIGITAL CONTENT ANALYSIS

BACKGROUND

Creators of digital content to be distributed via content distribution channels employ various systems and techniques in an effort to increase a likelihood that the digital content is received in a manner consistent with a purpose of the digital content. Examples of this include an author utilizing a spelling/grammar checking system to improve readability of text in a digital article, a photographer using an editing preset to improve a visual appearance of a digital photograph, etc. By improving readability of the text, the digital article is more likely to be consumed. Similarly, the digital photograph is more likely to be shared after improving its visual appearance.

SUMMARY

Techniques and systems for digital content analysis are described. In an example, a computing device implements an analysis system to receive input data describing digital content to be analyzed based on content metrics. The analysis system extracts a first content component and a second content component from the digital content. For example, the analysis system generates first embeddings by processing the first content component using a first machine learning model and second embeddings by processing the second content component using a second machine learning model.

The first embeddings and the second embeddings are deconfounded and combined as concatenated embeddings. In one example, the analysis system generates an indication of a content metric for display in a user interface based on the concatenated embeddings. For instance, the indication is a prediction, a description, or a prescription relative to the digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures Entities represented in the figures are indicative of one or more entities and thus reference is made interchangeably to single or plural forms of the entities in the discussion.

FIG. 1 is an illustration of an environment in an example implementation that is operable to employ systems and techniques for digital content analysis as described herein.

FIG. 11 is a flow diagram depicting a procedure in an example implementation in which content components extracted from digital content are processed using machine learning models.

DETAILED DESCRIPTION

Overview

Figure 2:
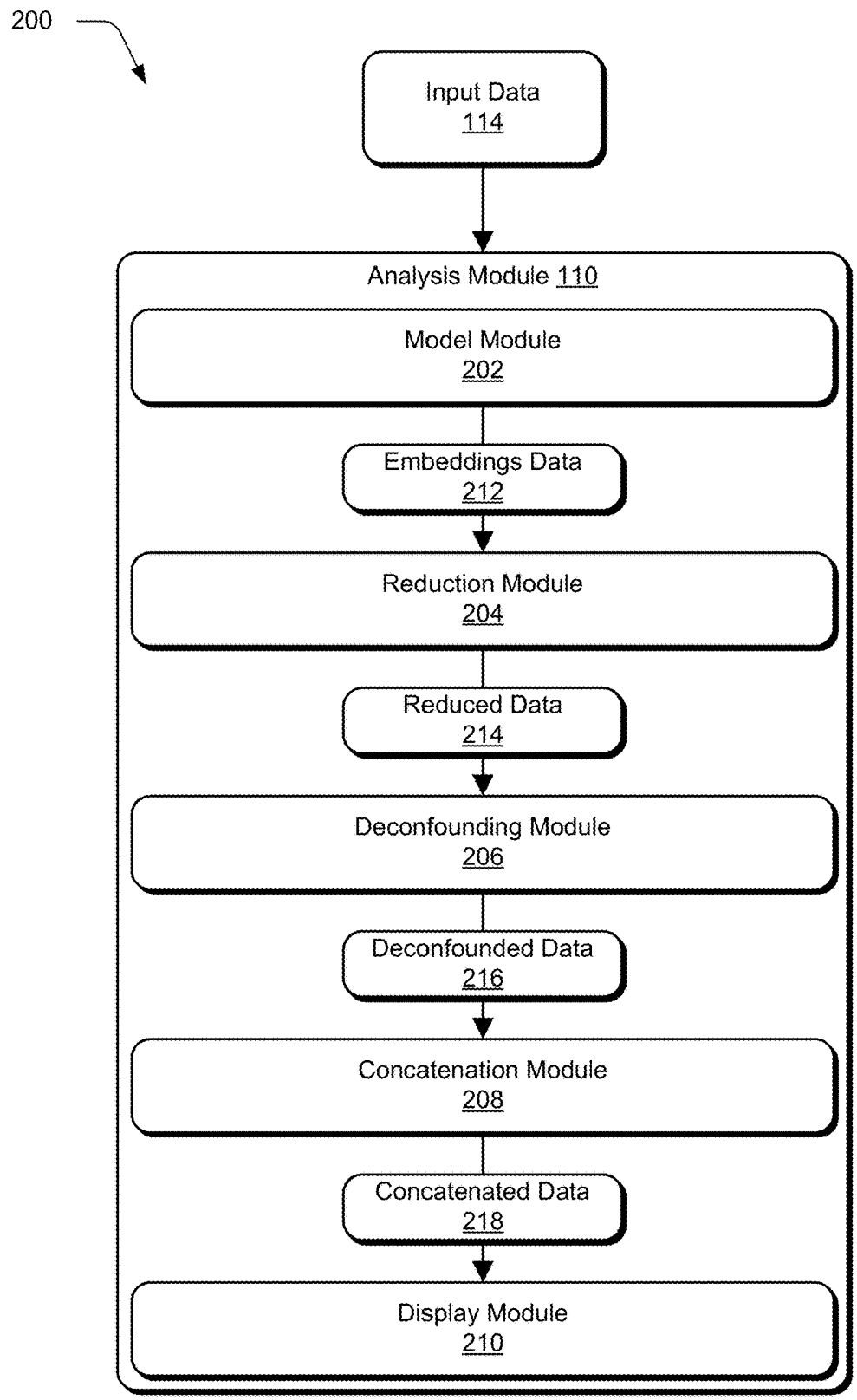
FIG. 2 depicts a system in an example implementation showing operation of an analysis module for digital content analysis.

Conventional systems for increasing a likelihood that digital content distributed via a content distribution channel will be received in a manner consistent with a purpose of the digital content are limited to providing correlation-based insights such as text without spelling/grammar errors is more likely to be read/consumed or aesthetically pleasing photographs are more likely to be shared. However, these correlation-based insights are not viable in high-dimensional multimodal scenarios (e.g., images, text, presentation, and other features) which are common for digital content distributed via content distribution channels. In such multimodal scenarios, insights provided by conventional systems become biased and/or misleading. In order to overcome the limitations of conventional systems, techniques and systems for digital content analysis are described.

In an example, a computing device implements an analysis system to receive input data describing digital content to be analyzed based on content metrics. The analysis system processes the input data to extract content components from the digital content. Examples of content components include digital images, sequences of text, layouts of hypertext markup language elements, timestamps, and so forth.

For example, after extracting the content components from the digital content, the analysis system processes the content components with machine learning models trained on training data to generate embeddings for content components. In some examples, the analysis system process particular types of the content components using particular architectures of the machine learning models. Examples of the machine learning models include a Contrastive Language-Image Pretraining model, a Bidirectional Encoder Representations from Transformers model, a Long-Document Transformer model, a multilayer perceptron model, etc.

Consider an example in which the analysis system generates embeddings for the content components by processing the content components using the machine learning models. In this example, the analysis system reduces dimensionality of the embeddings using an autoencoder and then generates or computes deconfounded embeddings based on the embeddings with reduced dimensionality. In an embodiment, the deconfounded embeddings may refer to latent representations which encode causal effects of treatments but do not encode confounding information.

To compute the deconfounded embeddings in an example, the analysis system utilizes a conditional adversarial learning system which includes a discriminator network and a predictor network. For example, in order to train the conditional adversarial learning system, the predictor network predicts a content metric given confounding variables and the discriminator network is simultaneously implemented to deconfound (e.g., predict) a causal effect of a treatment on the content metric given a last layer representation. Once the discriminator network is unable to predict the causal effect of the treatment as part of the training, then representation of the content metric and the confounding variables are decorrelated as the deconfounded embeddings. Continuing the example, the analysis system combines the deconfounded embeddings as concatenated embeddings. For instance, the analysis system generates an indication of a content metric for display in a user interface by processing the concatenated embeddings using a multilayer perceptron model. The indication of the content metric is a prediction, a description, and/or a prescription with respect to the digital content.

Unlike conventional systems which are limited to providing correlation-based insights, the described systems for digital content analysis are capable of generating indications of content metrics which causally convey insights relative to high-dimensional, multimodal digital content. Continuing the example, the indication of the content metric includes a prediction which conveys that a level of performance of the digital content will be medium or average. For example, the indication of the content metric also includes a description which conveys that a size of a sequence of text included in a content component is too small and a prescription that conveys alternatives for increasing the size of the sequence of text. The described systems are capable of optimizing a particular content metric over an intervention space such as to indicate which version of multiple versions of a digital image should be included in the digital content to cause the predicted level of performance of the digital content to be high or above average which is an additional improvement relative to the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 includes a storage device 108 and an analysis module 110.

The storage device 108 is illustrated to include analytics data 112 which describes historic information about digital content and interactions with the digital content. For example, the analytics data 112 describes digital content distributed and monitored via a content distribution channel or multiple content distribution channels as well as a composition or substance of the digital content (e.g., text, images, colors, intents, etc.), layouts of hypertext markup language elements included in the digital content, timestamps associated with distributing the digital content via the content distribution channels, and so forth. The analytics data 112 also describes how the digital content was received via the content distribution channels such as a number of times the digital content was viewed, a number of comments received relative to the digital content, sentiment/context of these comments, whether the digital content was shared or liked and how many times, whether the digital content was rated positively or negatively and how many times, etc. In an example, the analytics data 112 describes how interactions with the digital content are performed such as tactilely via touch (e.g., using a touchscreen input device), scrolling (e.g., using a mouse input device), keystrokes (e.g., using a keyboard input device), voice commands (e.g., using a microphone input device), and so forth. In this example, the analytics data 112 is capable of describing human-based information about interactions with the digital content such as eye movements of users (e.g., using gaze tracking), whether the digital content is consumed by a single user or simultaneously by multiple users, etc.

In some examples, the analytics data 112 describes information that is specific to particular domains of digital content. For example, this domain specific information generalizes observations from particular domains such as digital content having digital images generally outperforms digital content having relatively long sequences of text in the particular domains. In another example, the domain specific information clarifies differences between observations from particular domains and observations from across many domains. For instance, across the many domains digital content having text with a positive sentiment generally outperforms digital content having text with a negative sentiment; however, in a particular domain, digital content having text with a negative sentiment generally outperforms digital content having text with a positive sentiment.

The analysis module 110 is illustrated as having, receiving, and/or transmitting input data 114 describing digital content 116 to be analyzed based on content metrics. As shown, the digital content 116 is a flyer or pamphlet promoting a grand opening of "CLAIRE'S BARBECUE" which includes content components such as a digital image/graphic depicting a barbecue grill; a heading which is text stating "Grand Opening;" a date of the grand opening; an address of "CLAIRE'S BARBECUE;" and body text which states "Queue for Barbecue!!" between the date and the address.

The analysis module 110 receives and processes the input data 114 to extract the content components from the digital content 116 for processing the content components using machine learning models. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

For example, the analysis module 110 includes or has access to a Bidirectional Encoder Representations from Transformers model, a Contrastive Language-Image Pre-training model, a Long-Document Transformer model, a multilayer perceptron model, and so forth. In an example, the machine learning models included in or available to the analysis module 110 are pretrained on training data to generate embeddings for content components in a latent space. In another example, the analysis module 110 trains the machine learning models on training data to generate embeddings for content components in the latent space. For instance, the training data includes portions of the analytics data 112 or an entirety of the analytics data 112.

Consider an example in which the analysis module 110 processes the input data 114 to extract the digital image/graphic depicting the barbecue grill from the digital content 116 as a first content component, and the analysis module 110 generates first embeddings by processing the first content component using the Contrastive Language-Image Pre-training model. In this example, the analysis module 110 extracts the heading stating "Grand Opening" and the title text stating "CLAIRE'S BARBECUE" from the digital content 116 as second content components. For example, the analysis module 110 generates second embeddings by processing the second content components using the Bidirectional Encoder Representations from Transformers model.

Continuing the example, the analysis module 110 processes the input data 114 to extract the body text which states "Queue for Barbecue!!" from the digital content 116 as a third content component, and the analysis module 110 generates third embeddings by processing the third content component using the Long-Document Transformer model. The analysis module 110 extracts a layout of hypertext markup language elements included in the digital content 116 using a document object model for the digital content 116. In one example, the analysis module 110 extracts an order, relative sizes, and types of the hypertext markup language elements from the digital content 116 as a fourth content component. In this example, the analysis module 110 generates fourth embeddings by processing the fourth content component using the multilayer perceptron model.

For example, the analysis module 110 reduces dimensionality of the first, second, third, and fourth embeddings using an autoencoder to generate first, second, third, and fourth embeddings with reduced dimensions. The analysis module 110 then deconfounds the embeddings with reduced dimensions using conditional adversarial learning. In an example, the analysis module 110 includes or has access to a predictor model and a discriminator model which are simultaneously trained as "adversaries." For instance, the predictor model learns to predict a content metric given confounding variables and the discriminator model learns to deconfound a causal effect of a treatment on the content metric in an adversarial manner.

The analysis module 110 generates deconfounded embeddings based on the first, second, third, and fourth embeddings with reduced dimensions using the conditional adversarial learning. For example, the analysis module 110 combines the deconfounded embeddings as concatenated embeddings, and processes the concatenated embeddings using an additional multilayer perceptron model and/or a structural causal model (e.g., trained on the analytics data 112) to generate an analysis summary 118 for the digital content 116 which is displayed in a user interface 120 of the display device 106. As shown, the analysis summary 118 includes indications 122-126 of content metrics. For instance, indication 122 is predictive, indication 124 is descriptive and prescriptive, and indication 126 is predictive and prescriptive.

The indication 122 is predictive because the indication 122 conveys that a level of performance for the digital content 116 will be "Medium." For example, the indication 124 is descriptive because the indication 124 conveys that "The colors don't match well with each other." The indication 124 is also prescriptive because the indication 124 conveys "Try a different color scheme." Accordingly, the indication 124 is a suggestion relative to the digital content 116 to modify a value of a content metric for the digital content 116 such as the level of performance which is predicted to be "Medium" but could be decreased to "Low" or increased to "High."

In another example, the indication 126 is predictive because the indication 126 conveys "Audience will likely not pay attention to this text" which is in reference to the title text stating "CLAIRE'S BARBECUE." The indication 126 is prescriptive because the indication 126 conveys "Consider moving the location or using the bigger font size." Thus, the indication 126 is a suggestion to modify a value of a content metric for the digital content (e.g., to change the predicted level of performance from "Medium" to "High").

Based on the indications 122-126 of the content metrics, a user interacts with an input device (e.g., a mouse, a stylus, a keyboard, a touchscreen, etc.) relative to the user interface 120 and manipulates the input device to increase a font size of the title text stating "CLAIRE'S BARBECUE." For example, the user further manipulates the input device to change a color scheme of the digital content 116. In a first example, after increasing the font size and changing the color scheme, the user interacts with the input device to distribute the digital content 116 via a content distribution channel. In this first example, the user improves the digital content 116 based on the indications 122-126 of the content metrics before distributing the digital content 116.

In a second example, after increasing the font size and changing the color scheme, the user interacts with the input device to cause the analysis module 110 to perform a digital content analysis on the digital content 116 having the increased size of the title text stating "CLAIRE'S BARBECUE" and the changed color scheme. In the second example, the analysis module 110 updates the analysis summary 118 which changes the level of performance for the digital content 116 conveyed by the indication 122 from "Medium" to "High." Continuing the second example, after updating the analysis summary 118, the user interacts with the input device to distribute the digital content 116 via a content distribution channel.

Consider an example in which predictive and prescriptive insights such as the insights that indication 122 is predictive, indication 124 is descriptive and prescriptive, and indication 126 is predictive and prescriptive are usable as prompts or inputs to generative models such as a Generative Pre-Trained Transformer 3 model (GPT-3), a Generative Pre-Trained Transformer 4 model (GPT-4), a Zero-Shot Text-to-Image Generation model (DALL·E), a Hierarchical Text-Conditional Image Generation with CLIP Latents model (DALL·E 2), etc. In this example, instead of generating indications such as "the same text in a red color would work better," the analysis module 110 uses the generative models to generate the same text in the red color for display in the user interface 120. For example, additionally or alternatively to generating the indication 124 conveying "Try a different color scheme," the analysis module 110 uses the generative models to generate the digital content 116 having the different color scheme for inclusion in the analysis summary 118. Accordingly, in some examples, the indications 122-126 are generations generated by the generative models based on predictive and prescriptive insights.

FIG. 2 depicts a system 200 in an example implementation showing operation of an analysis module 110. The analysis module 110 is illustrated to include a model module 202, a reduction module 204, a deconfounding module 206, a concatenation module 208, and a display module 210. In an example, the model module 202 receives and processes the input data 114 to generate embeddings data 212.

Figure 3:
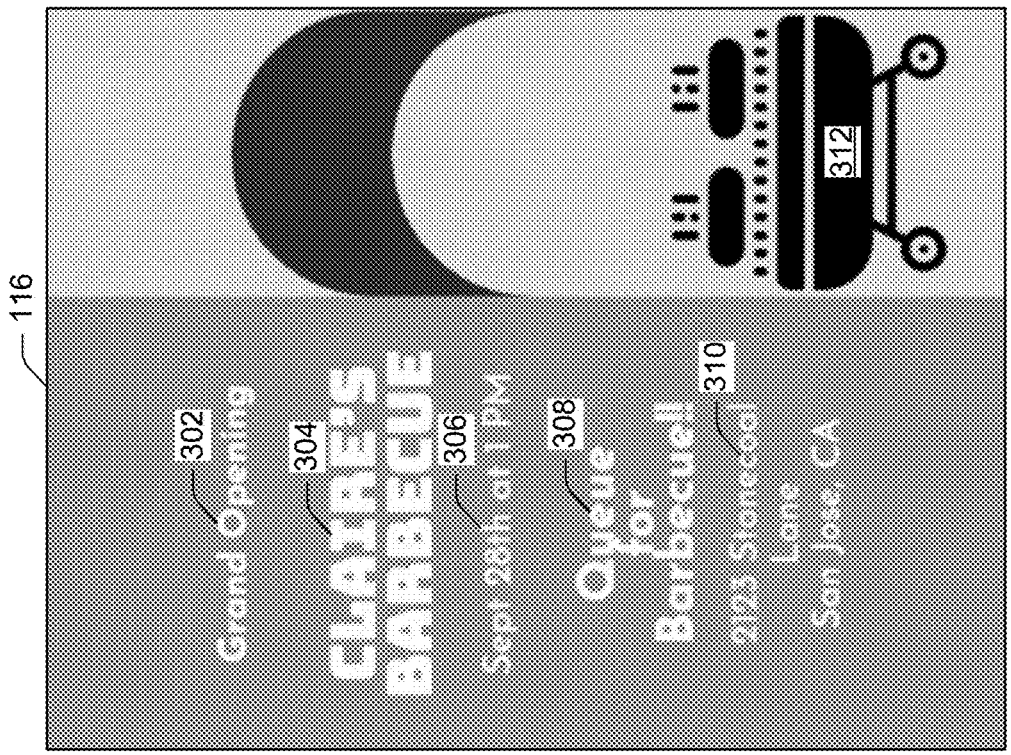
FIG. 3 illustrates a representation of input data describing digital content to be analyzed based on content metrics.

FIG. 3 illustrates a representation 300 of input data describing digital content to be analyzed based on content metrics. As shown in the representation 300, the input data 114 describes the digital content 116 which includes content components 302-312. For example, content component 302 is the heading text stating "Grand Opening;" content component 304 is the title text stating "CLAIRE'S BARBECUE;" content component 306 is the date which is "September 28th at 1 PM;" content component 308 is the body text which states "Queue for Barbecue!!;" content component 310 is the address which is "2123 Stonecoal Lane, San Jose, CA;" and content component 312 is the digital image/graphic depicting the barbecue grill.

For instance, the model module 202 processes the input data 114 to extract the content components 302-312 from the digital content 116 for processing using machine learning models. Additionally in a first example, the model module 202 processes the input data 114 to extract a layout of hypertext markup language elements from the digital content 116 using a document object model of the digital content 116. In this first example, the model module 202 extracts hypertext markup language elements such as H1-6 (e.g., six levels of headings), paragraphs, links, blockquotes, images, videos, and banners from the digital content 116 as first additional content components. The model module 202 also determines a count of words, sentences, images, and paragraphs included in the digital content 116, and the model module 202 extracts these counts as the first additional content components. For example, the first additional content components collectively capture a number, size, order, and type of objects which are present in the digital content 116.

Additionally in a second example, the model module 202 extracts information from a timestamp (if available) corresponding to an initial release or an initial distribution of the digital content 116 via a content distribution channel. In this second example, the model module 202 extracts a release date represented in the timestamp (e.g., a UNIX timestamp), a release day of the week, and a release time from the digital content 116 as second additional content components. For instance, the second additional content components capture the timestamp corresponding to the initial release of the digital content 116 because interactions with the digital content 116 are dependent on the initial release time and date.

Additionally in a third example, the model module 202 extracts content engagement features via the network 104 as third additional content components. While the content components 302-312, the first additional content components, and the second additional content components represent innate features of the digital content 116, the third additional content components represent topic popularity in terms of numbers of searches. For example, in order to generate the third additional content components, the model module 202 identifies a top N (e.g., a top 50, a top 100, a top 200, etc.) keywords of articles searched over a period of time (e.g., a past year). The model module 202 orders the top N keywords searched over the period of time based on term frequency-inverse document frequency (tf-idf) scores for the keywords and extracts the ordered keywords as the third additional content components.

Figure 4:
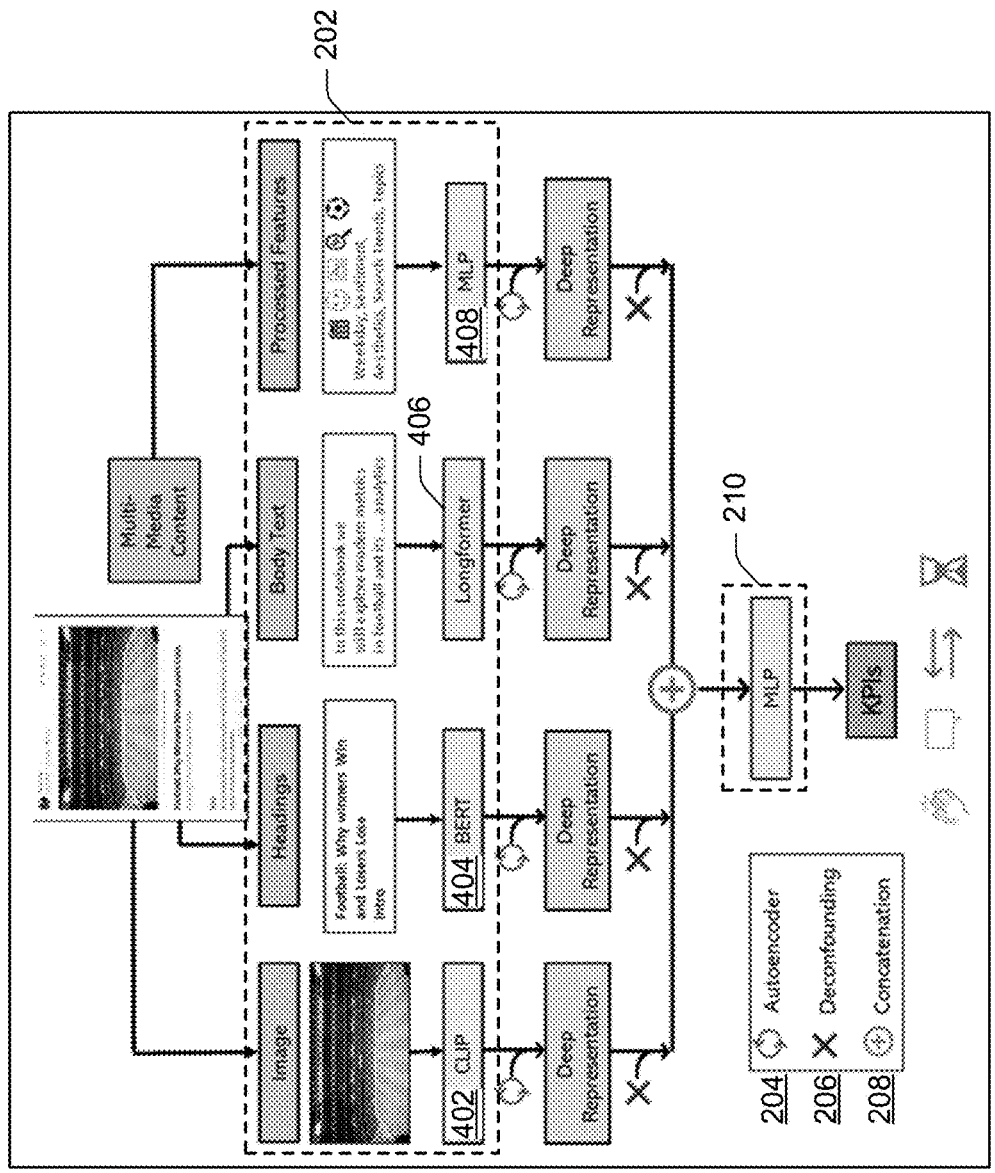
FIG. 4 illustrates a representation of processing content components extracted from digital content using machine learning models.

FIG. 4 illustrates a representation 400 of processing content components extracted from digital content using machine learning models. As shown in the representation 400, the model module 202 includes or has access to machine learning models 402-408. For example, the model module 202 processes the content components 302-312, the first additional content components, the second additional content components, and the third additional content components using the machine learning models 402-408 and additional models to generate the embeddings data 212.

In an example, machine learning model 402 includes the Contrastive Language-Image Pretraining model; machine learning model 404 includes the Bidirectional Encoder Representations from Transformers model; machine learning model 406 includes the Long-Document Transformer model; and machine learning model 408 includes the multilayer perceptron model. The model module 202 computes Flesch reading ease scores for the content components 302-310 which indicates a readability of the text included in the content components 302-310. In one example, the model module 202 implements a model as described by Gilbert et al., *Vader: A parsimonious rule-based model for sentiment analysis of social media text*, Proceedings of the international AAAI conference on web and social media, Vol. 8, 216-225 (2014), to compute sentiment polarity for the text included in the content components 302-310.

For example, the model module 202 processes the content component 312 using a model as described by Milanfar et al., *NIMA: Neural image assessment*, IEEE transactions on image processing, 27, 8, 3998-4011 (2018), to extract image aesthetics from the content component 312. In this example, the model module 202 generates first embeddings for the digital content 116 by processing the content component 312 using the machine learning model 402. In an example, the model module 202 generates second embeddings for the digital content 116 by processing the content components 302, 304 using the machine learning model 404.

In some examples, the model module 202 processes the content component 308 using the machine learning model 406 to generate third embeddings for the digital content 116. For instance, the model module 202 generates fourth embeddings for the digital content 116 by processing the first additional content components, the second additional content components, and the third additional content components using the machine learning model 408. In one example, the model module 202 generates the embeddings data 212 as describing the first, second, third, and fourth embeddings for the digital content 116.

The reduction module 204 receives and processes the embeddings data 212 to generate reduced data 214. For example, the reduction module 204 processes the embeddings data 212 using a machine learning model such as an autoencoder to reduce dimensionality of the first, second, third, and fourth embeddings. In one example, the reduction module 204 fixes a size of all features using the autoencoder (e.g., a layer of the autoencoder) to be 128. In other examples, the reduction module 204 fixes the size of all features to be less than 128 or more than 128.

In an example, the reduction module 204 processes the first, second, third, and fourth embeddings described by the embeddings data 212 using the autoencoder to generate first reduced embeddings, second reduced embeddings, third reduced embeddings, and fourth reduced embeddings. In this example, the reduction module 204 generates the reduced data 214 as describing the first, second, third, and fourth reduced embeddings. The deconfounding module 206 receives and processes the reduced data 214 to generate deconfounded data 216. To do so in one example, the deconfounding module 206 decorrelates representations of treatment variables and representations of confounding variables.

For instance, by decorrelating the representations of treatment variables and the representations of confounding variables, it is possible to learn multimodal causal representations that answer predictive, descriptive, and prescriptive queries with respect to the content components 302-312 and a level of engagement for the digital content 116. In one example, given a multimodal instance of digital content (e.g., the digital content 116) having imagery $x_I$ features, text $x_T$ features, presentation and aesthetics $x_A$ features, and popularity $x_P$ features, an informativeness coefficient is representable as:

$$I(X) = \mathbb{E}_c[\text{Var}[\mathbb{E}_z[Y \mid X, C] \mid C]]$$

where: I(X) measures a strength of X's causal effect on content metric Y; X represents a feature of the digital content (e.g., a sentiment of the content); and C represents confounding variables (e.g., a topic and author in the case of sentiment).

In some examples, the deconfounding module 206 uses the following assumptions to ensure that a treatment effect is measurable. Stable Unit Treatment Value Assumptions (SUTVA): The potential outcomes for any unit do not vary with the treatment assigned to other units, and, for each unit, there are no different forms or versions of each treatment level which lead to different potential outcomes. Consistency: The potential outcome of treatment X equals the observed outcome if an actual treatment received is X. Ignorability: Given pre-treatment covariates, e.g., the covariates affect the treatment, treatment assigned is independent of the potential outcomes. Following these assumptions, if the deconfounding module 206 fixes C and there is any variance remaining in Y(X), e.g., Var[$\mathbb{E}$ [Y|X, C]|C]>0, then the feature X has a causal effect on Y.

Figure 5:
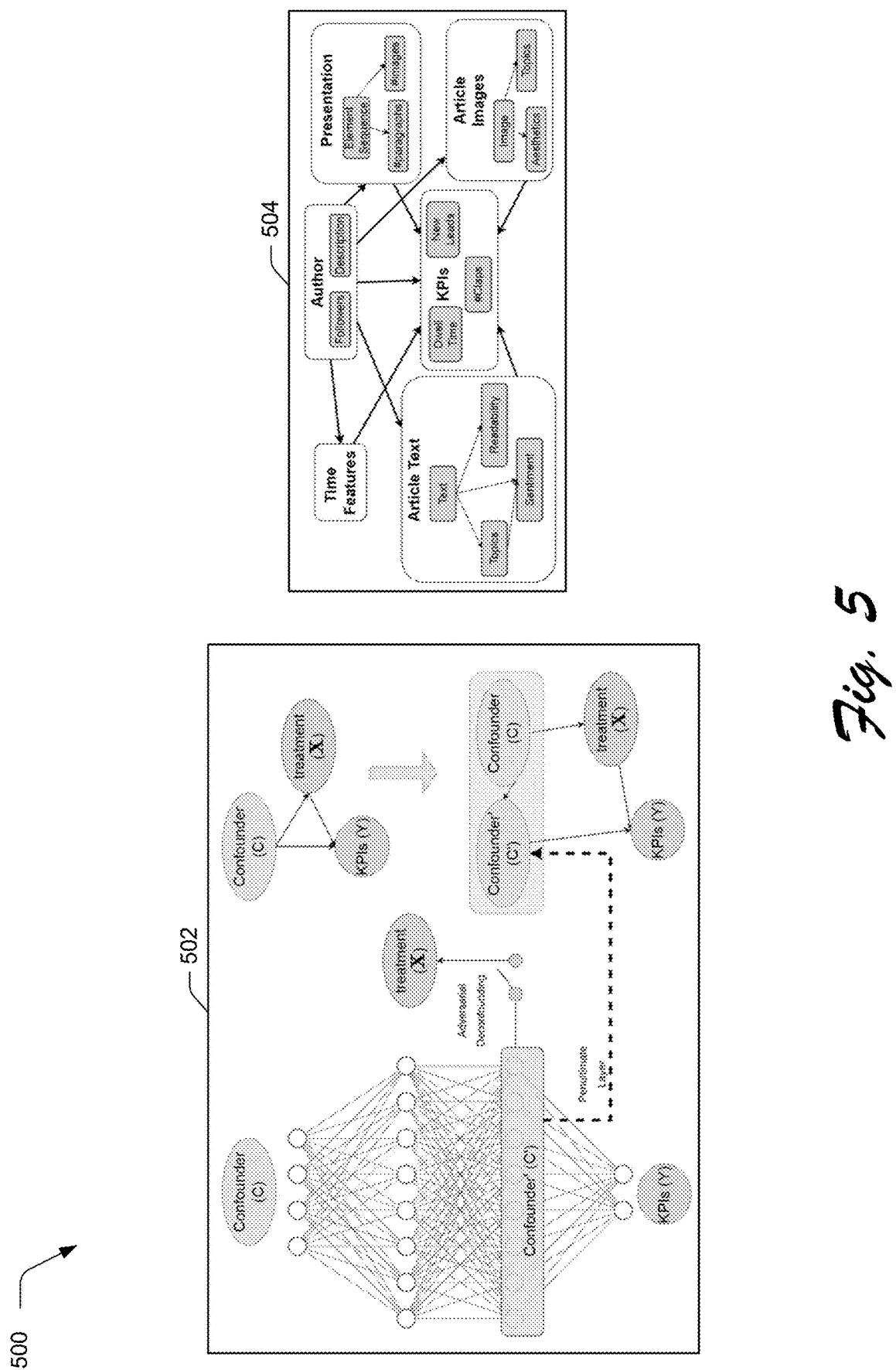
FIG. 5 illustrates a representation of estimating a causal-treatment effect and a structural causal model.

FIG. 5 illustrates a representation 500 of estimating a causal-treatment effect and a structural causal model. As shown in FIG. 5, the representation includes a framework 502 and a structural causal model 504. With reference to the framework 502, the deconfounding module 206 calculates the informativeness coefficient using conditional adversarial learning over a learned confounder representation space such that an adversarial learning based discriminator model is unable to predict the treatment. For example, the learning procedure has removed all information present about the treatment. To do so in one example, the deconfounding module 206 implements a predictor module which learns to predict Y given C and, simultaneously, trains another network (e.g., an adversary) to adversarially deconfound X given the last layer model representations.

In order to extract a cofounder-treatment relationship, the deconfounding module 206 uses all variables except the treatment variable as the confounding variables and decorrelates their representations. For example, the deconfounding module 206 integrates domain knowledge described by the analytics data 112 using the structural causal model 504. In an example, the structural causal model 504 captures causal mechanisms of a system and is obtainable via prior experience or A/B testing.

As outlined above, the analysis module 110 is capable of generating indications of content metrics for the digital content 116 which can be predictive, descriptive, and/or prescriptive. To generate predictive indications, the analysis module 110 leverages the analytics data 112 to divide possible predicted levels of performance for the digital content 116 into three bins (e.g., low, medium, and high). For instance, the analysis module 110 trains the model module 202 (e.g., using the analytics data 112) with a causal objective for each of the three bins. To generate descriptive indications, the analysis module 110 leverages integrated gradients to estimate feature importance scores. For example, the integrated gradients determine blame assignments as follows: given an input x and a baseline b, an integrated gradient along the ith dimension is representable as:

$$IG_i(x, b) = (x_i - b_i) \int_{\alpha=0}^{1} \frac{\partial F(b + \alpha(x - b))}{\partial x_i} d\alpha$$

where: $\partial F(x)/\partial x_i$ represents gradient F along the ith dimension of x.

Figure 6:
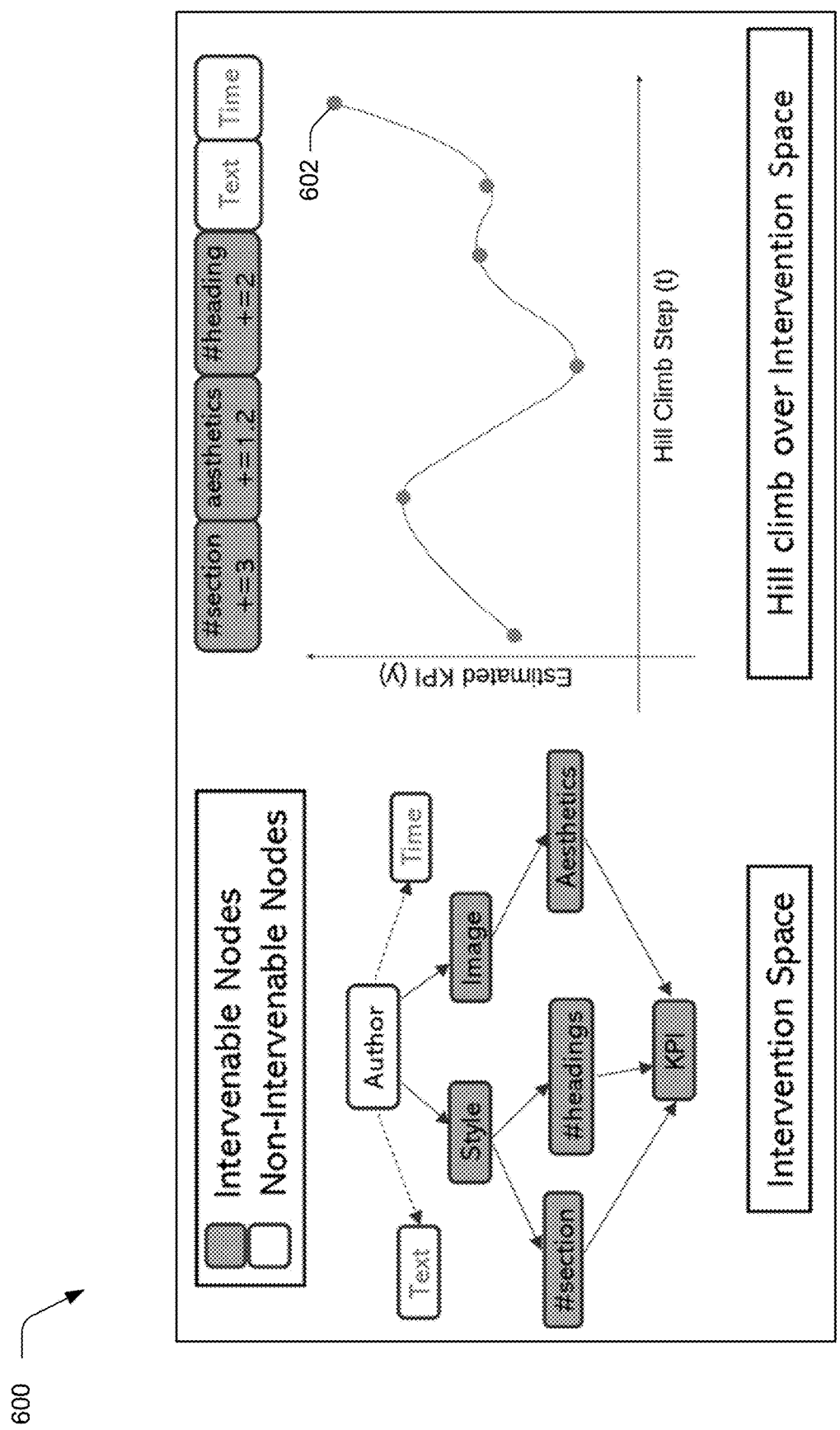
FIG. 6 illustrates a representation of identifying an optimal set of values over a defined intervention space.

FIG. 6 illustrates a representation 600 of identifying an optimal set of values over a defined intervention space. In order to generate prescriptive indications, the analysis module 110 implements the deconfounding module 206 to define an intervention space ($X_F$) as a set of features (F) which are optimizable for the digital content 116. In one example, when optimizing digital images to be included in the digital content 116, the intervention space ($X_F$) includes an image node, for example, (do($X_F=x_I$)), while other nodes are seen as conditionals ($C_X$) and are held constant.

Accordingly, optimizing content metric (Y) on the given intervention space ($X_F$) is representable as:

$$\max_{x_I} (P(Y = y \mid do(X_F = x_I), C_X = c_x))$$

where: no external intervention is done on $C_X$ (e.g., an observation of $C_X=c_x$ is used with do notation).

For instance, a hill climbing algorithm is used to maximize 602 the above representation in order to optimize the content metric (Y). In some examples, the deconfounding module 206 generates the deconfounded data 216 as describing deconfounded first embeddings, deconfounded second embeddings, deconfounded third embeddings, and deconfounded fourth embeddings. The concatenation module 208 receives and processes the deconfounded data 216 to generate concatenated data 218. To do so in one example, the concatenation module 208 combines the deconfounded first embeddings, the deconfounded second embeddings, the deconfounded third embeddings, and the deconfounded fourth embeddings as concatenated embeddings. In this example, the concatenation module 208 generates the concatenated data 218 as describing the concatenated embeddings.

Figure 7:
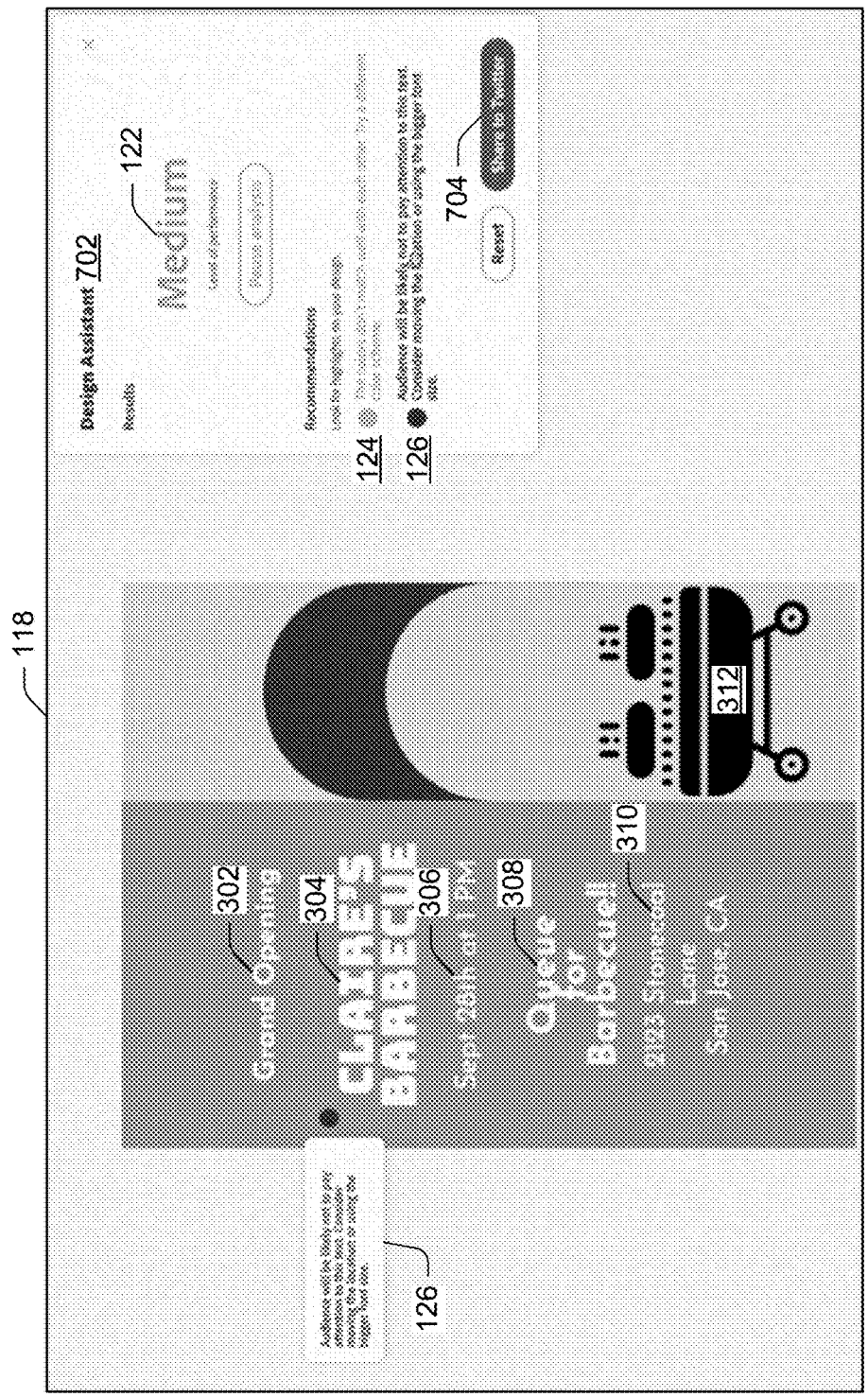
FIG. 7 illustrates a representation of a first analysis performed on digital content.

FIG. 7 illustrates a representation 700 of a first analysis performed on digital content. As illustrated in FIG. 7, the representation 700 includes an analysis summary 118 for the digital content 116. For example, the display module 210 renders the analysis summary 118 in the user interface 120 of the display device 106. In order to generate the analysis summary 118, the display module 210 processes the concatenated data 218 using a fully-connected multilayer perceptron model to generate indications 122-126 of content metrics.

As shown, the analysis summary 118 includes a design assistant 702 which is a user interface for conveying the indications 122-126 of content metrics based on the digital content analysis of the digital content 116. The design assistant 702 is illustrated to include a user interface element 704 which a user is capable of interacting with by manipulating an input device (e.g., a stylus, a mouse, a keyboard, a touchscreen, etc.) relative to the analysis summary 118 to cause the digital content 116 to be distributed via a content distribution channel. In an example, the user interacts with the input device relative to the digital content 116 to modify a color scheme as prescribed by the indication 126. In this example, the user also interacts with the input device relative to the digital content 116 to increase a relative size of the text included in the content component 304. For example, the user interacts with the input device to cause the analysis module 110 to perform a second digital content analysis on the digital content 116 having the modified color scheme and the increased relative size of the text "CLAIRE'S BARBECUE."

Figure 8:
FIG. 8 illustrates a representation of a second analysis performed on digital content.

FIG. 8 illustrates a representation 800 of a second analysis performed on digital content. The digital assistant 702 includes indications 802, 804 based on the second digital content analysis. Indication 802 is predictive and conveys that the level of performance for the digital content 116 will be "Medium." Indication 804 is descriptive and conveys that the "Content is not interesting." For instance, the indication 804 is also prescriptive because the indication 804 conveys "Try adding more visuals or changing the copy."

As shown in the representation, the digital content 116 includes content components 806-812 as well as the content component 304. In one example, before performing the second digital content analysis on the digital content 116, the user manipulates the input device relative to the analysis summary 118 to generate content component 806 by decreasing a size of the text included in the content component 302; generate content component 808 by decreasing a size of the text included in the content component 306; generate content component 810 by decreasing a size of the text included in the content component 308; and generate content component 812 by decreasing a size of the text include in the content component 310. For example, after performing the second digital content analysis on the digital content 116 and observing the indication 804, the user interacts with the input device to generate content component 814 by replacing the digital image/graphic depicting the barbeque grill included in the content component 312 with a different digital image/graphic that depicts a different barbeque grill. The user then interacts with the input device to cause the analysis module 110 to perform a third digital content analysis on the digital content 116 having the content component 814.

Figure 9:
FIG. 9 illustrates a representation of a third analysis performed on digital content.

FIG. 9 illustrates a representation 900 of a third analysis performed on digital content. The design assistant 702 included an indication 902 of a content metric which conveys that a level of performance for the digital content 116 will be "High." In an example, before causing the analysis module 110 to perform the third digital content analysis on the digital content 116, the user manipulates the input device relative to the analysis summary 118 to generate a content component 904 by rearranging text included in the content component 812. After performing the third digital content analysis on the digital content 116 and observing the indication 902, the user manipulates the input device relative to the analysis summary 118 to interact with the user interface element 704 and distribute the digital content 116 via the content distribution channel.

Figure 10:
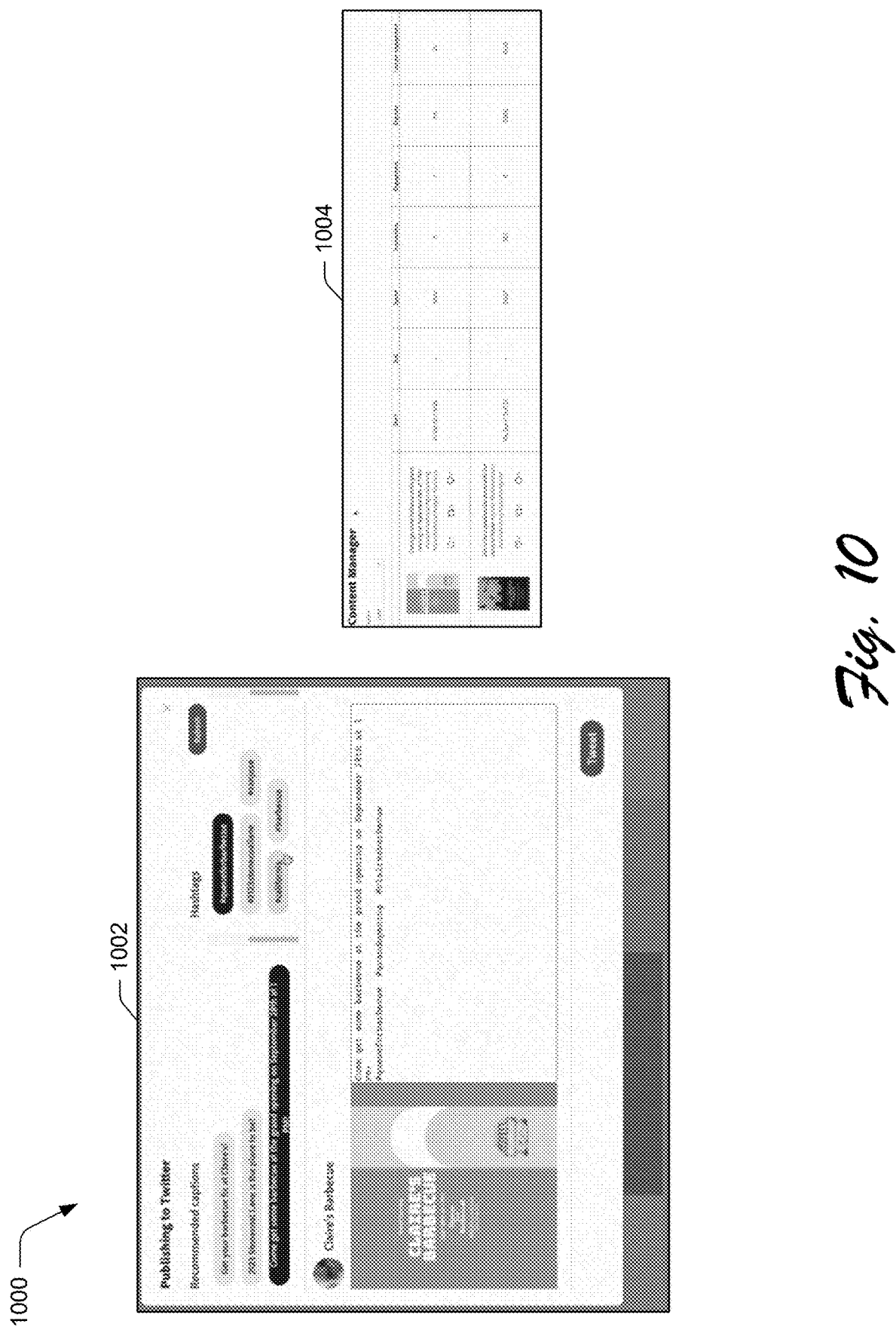
FIG. 10 illustrates a representation of user interfaces for digital content analysis via a content distribution channel for distributing digital content.

FIG. 10 illustrates a representation 1000 of user interfaces for digital content analysis via a content distribution channel for distributing digital content. The representation 1000 includes user interfaces 1002, 1004. User interface 1002 is usable to add suggested hashtags to the digital content 116 for distribution via the content distribution channel. User interface 1004 is usable to track an actual performance of the digital content 116 relative to actual performances of other digital content. By modifying the digital content 116 based on the digital content analyses performed relative to the digital content 116 before distributing the digital content 116 via the content distribution channel, a likely performance of the digital content 116 is maximized which is not possible in conventional systems that are limited to suggesting non-substantive (e.g., correlation-based) improvements such as spelling and grammar suggestions for text.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-10. FIG. 11 is a flow diagram depicting a procedure 1100 in an example implementation in which content components extracted from digital content are processed using machine learning models.

A first content component and a second content component are extracted from digital content to be analyzed based on content metrics (block 1102). For example, the computing device 102 implements the analysis module 110 to extract the first content component and the second content component from the digital content. First embeddings are generated by processing the first content component using a first machine learning model and second embeddings are generated by processing the second content component using a second machine learning model (block 1104). In one example, the analysis module 110 generates the first embeddings and the second embeddings.

The first embeddings and the second embeddings are combined as concatenated embeddings (block 1106). In some examples, the computing device 102 implements the analysis module 110 to combine the first and second embeddings as the concatenated embeddings. An indication of a content metric is generated for display in a user interface using a third machine learning model based on the concatenated embeddings (block 1108). For example, the analysis module 110 generates the indication of the content metric for display in the user interface.

Figure 12:
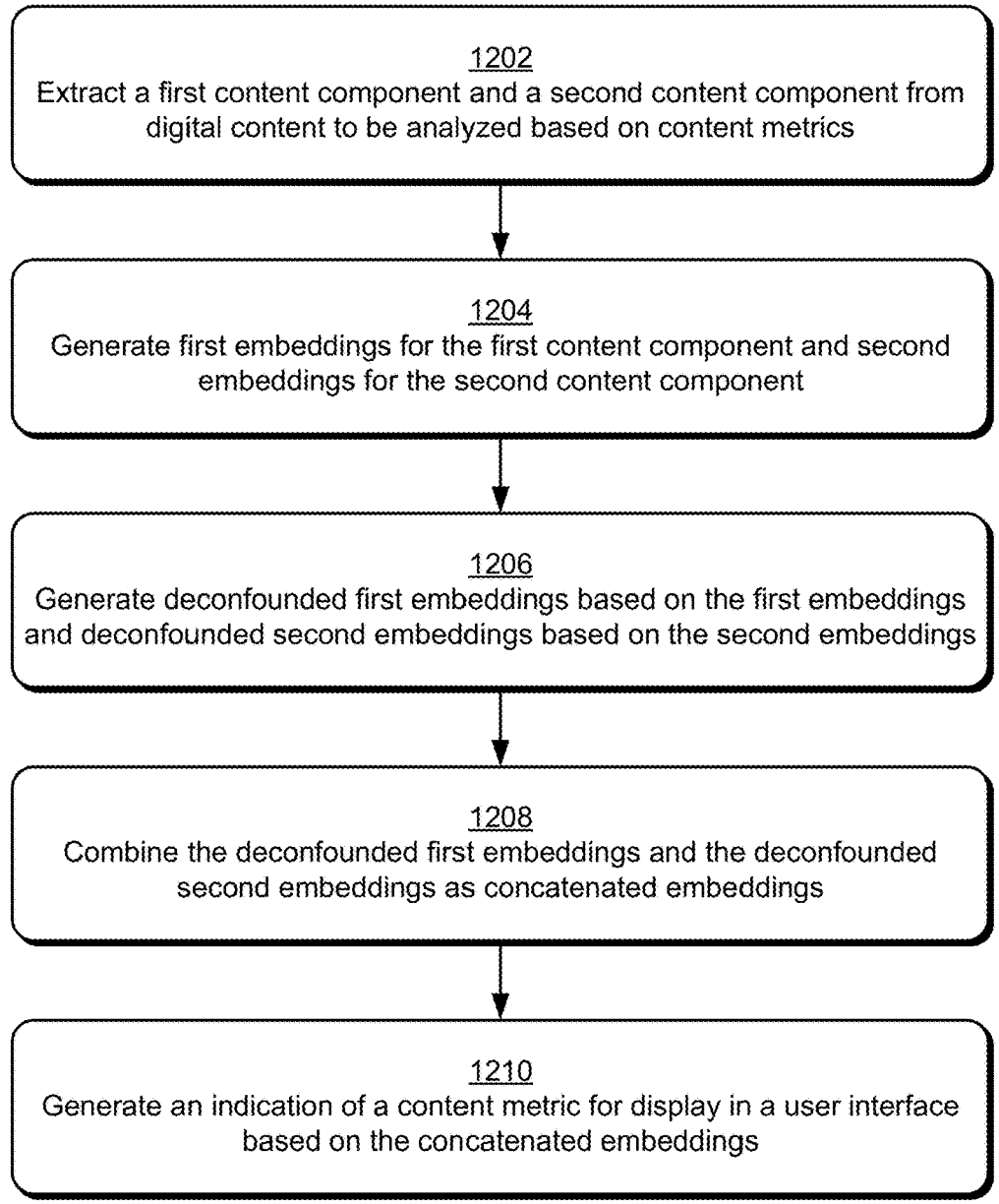
FIG. 12 is a flow diagram depicting a procedure in an example implementation in which an indication of a content metric is generated for display in a user interface.

FIG. 12 is a flow diagram depicting a procedure 1200 in an example implementation in which an indication of a content metric is generated for display in a user interface. A first content component and a second content component are extracted from digital content to be analyzed based on content metrics (block 1202). In an example, the analysis module 110 extracts the first content component and the second content component form the digital content. First embeddings are generated for the first content component and second embeddings are generated for the second content component (block 1204). For example, the analysis module 110 generates the first embeddings and the second embeddings.

Deconfounded first embeddings are generated based on the first embeddings and deconfounded second embeddings are generated based on the second embeddings (block 1206). In one example, the analysis module 110 generates the deconfounded first embeddings and the deconfounded second embeddings. The deconfounded first embeddings and the deconfounded second embeddings are combined as concatenated embeddings (block 1208). The analysis module 110 combines the deconfounded first embeddings and the deconfounded second embeddings as the concatenated embeddings in some examples. An indication of a content metric is generated for display in a user interface based on the concatenated embeddings (block 1210). For example, the analysis module 110 generates the indication of the content metric for display in the user interface.

Figure 13A:
FIGS. 13A, 13B, and 13C illustrate examples of digital content analyses.
Figure 13B:
Figure 13C:
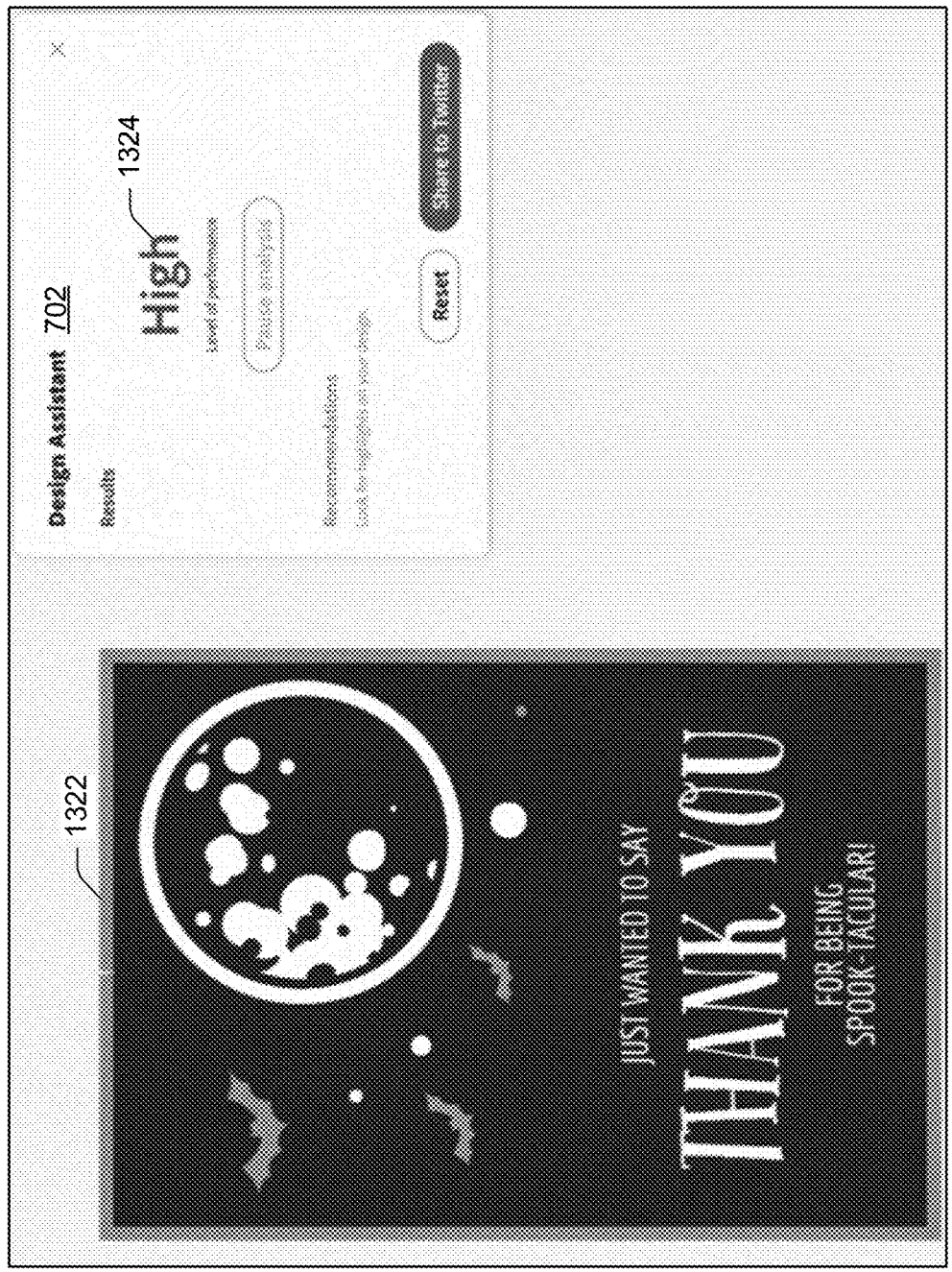

FIGS. 13A, 13B, and 13C illustrate examples of digital content analyses. FIG. 13A illustrates a representation 1300 of a first digital content analysis. FIG. 13B illustrates a representation 1302 of a second digital content analysis. FIG. 13C illustrates a representation 1304 of a third digital content analysis. With reference to FIG. 13B, the representation includes first digital content 1306 which is a poster or a handout promoting a Halloween Festival. The design assistant 702 includes indications 1308-1314 of content metrics for the digital content 1306.

For instance, indication 1308 is predictive and conveys that a level of performance of the digital content 1306 will be "Low." Indication 1310 is descriptive and prescriptive, indication 1312 is predictive and prescriptive, and indication 1314 is prescriptive. The indication 1310 conveys that "The colors don't match well with each other. Try a different color scheme." The indication 1312 conveys that the "Audience will be likely not to pay attention to this text. Consider moving the location or using a bigger font size." The indication 1314 conveys that "Text should be less than 20% of an image. Try a concise messaging or a smaller font size."

The representation 1302 of FIG. 13B includes digital content 1316 which is a poster that advocates wearing flannel garments. For example, the design assistant 702 includes indications 1318, 1320 of content metrics for the digital content 1316. Indication 1318 is predictive and conveys that a level of performance of the digital content 1316 will be "Medium." Indication 1320 is descriptive and prescriptive and conveys that "The colors are not vivid enough. Try to use brighter colors."

With reference to FIG. 13C, the representation 1304 includes digital content 1322. For instance, the digital content 1322 is a poster with text that states "JUST WANTED TO SAY THANK YOU FOR BEING SPOOK-TACULAR!" The design assistant 702 includes an indication 1324 which is predictive and conveys "High" as a level of performance for the digital content 1322.

Example System and Device

Figure 14:
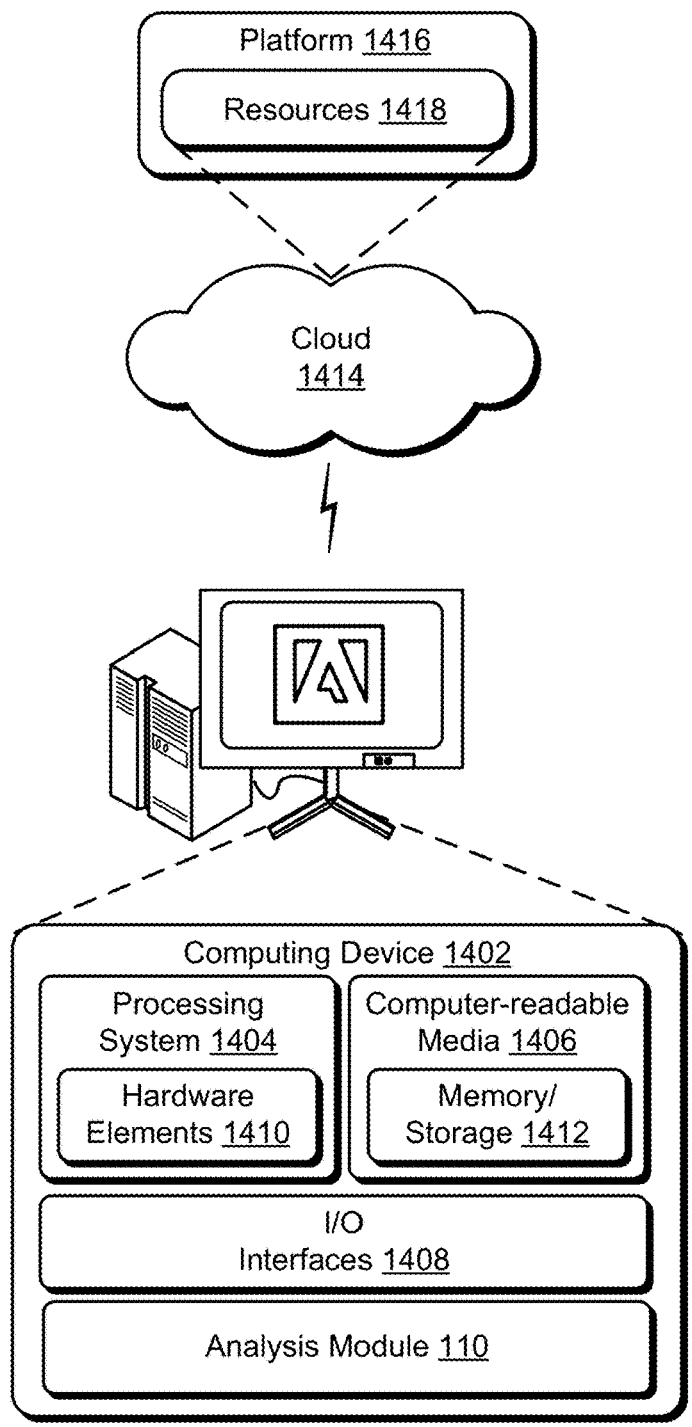
FIG. 14 illustrates an example system that includes an example computing device that is representative of one or more computing systems and/or devices for implementing the various techniques described herein.

FIG. 14 illustrates an example system 1400 that includes an example computing device that is representative of one or more computing systems and/or devices that are usable to implement the various techniques described herein. This is illustrated through inclusion of the analysis module 110. The computing device 1402 includes, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that are configured as processors, functional blocks, and so forth. This includes example implementations in hardware as an application specific integrated circuit or other logic device formed using one or more semiconductors. The hardware elements 1410 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1406 is illustrated as including memory/storage 1412. The memory/storage 1412 represents memory/storage capacity associated with one or more computer-readable media. In one example, the memory/storage 1412 includes volatile media (such as random access memory (RAM)) and/or nonvolatile media (such as read only memory (ROM), Flash memory, optical disks, magnetic disks, and so forth). In another example, the memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1410. For example, the computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supportable by various configurations of the computing device 1402 and are not limited to the specific examples of the techniques described herein. This functionality is also implementable entirely or partially through use of a distributed system, such as over a "cloud" 1414 as described below.

The cloud 1414 includes and/or is representative of a platform 1416 for resources 1418. The platform 1416 abstracts underlying functionality of hardware (e.g., servers) and software resources of the cloud 1414. For example, the resources 1418 include applications and/or data that are utilized while computer processing is executed on servers that are remote from the computing device 1402. In some examples, the resources 1418 also include services provided over the Internet and/or through a subscriber network, such as a cellular or Wi-Fi network.

The platform 1416 abstracts the resources 1418 and functions to connect the computing device 1402 with other computing devices. In some examples, the platform 1416 also serves to abstract scaling of resources to provide a corresponding level of scale to encountered demand for the resources that are implemented via the platform. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

What is claimed is:

1. A method comprising:
   extracting, by a processing device, a plurality of content components from an item of digital content;
   generating, by the processing device, a plurality of embeddings from the plurality of content components using one or more machine learning models;
   combining, by the processing device, the plurality of embeddings as a concatenated embedding; and
   generating, by the processing device, an indication of a content metric for display in a user interface using the one of more machine learning models based on the concatenated embedding, the indication indicating a prediction of a level of performance of the item of digital content and including a suggestion to modify at least one content component of the plurality of content components to change the level of performance.

2. The method as described in claim 1, further comprising reducing dimensionality of the plurality of embeddings using the one or more machine learning models.

3. The method as described in claim 2, wherein the reducing is performed using an autoencoder.

4. The method as described in claim 1, wherein the one or more machine learning models includes at least one of a Bidirectional Encoder Representations from Transformers model, a Contrastive Language-Image Pretraining model, a Long-Document Transformer model, or a multilayer perceptron model.

5. The method as described in claim 1, wherein at least one content component of the plurality of content components is at least one of a sequence of text, a digital image, a layout of hypertext markup language elements, or a timestamp.

6. The method as described in claim 1, further comprising deconfounding the plurality of embeddings using conditional adversarial learning.

7. The method as described in claim 1, wherein the indication of the content metric indicates at least one of a prediction, a description, a prescription, or a generation.

8. The method as described in claim 1, wherein the indication of the content metric is generated based on a content distribution channel for distributing the item of digital content.

9. The method as described in claim 1, wherein the indication of the content metric includes a suggestion to modify a value of the content metric.

10. The method as described in claim 1, wherein the indication of the content metric includes an estimated level of engagement for the at least one content component.

11. The method as described in claim 1, wherein a content component of the plurality of content components includes multiple versions and the indication of the content metric includes a version of the multiple versions that maximizes a value of the content metric.

12. A system comprising:
    a memory component; and
    a processing device coupled to the memory component, the processing device to perform operations comprising:
    extracting a plurality of content components from an item of digital content, the plurality of content components including text, a digital image, and a timestamp;
    generating a plurality of embeddings using one or more machine learning models from the plurality of content components;
    computing a plurality of deconfounded embeddings based on the plurality of embeddings; and
    generating an indication of a content metric for display in a user interface based on the plurality of deconfounded embeddings.

13. The system as described in claim 12, wherein the plurality of deconfounded embeddings are computed using conditional adversarial learning.

14. The system as described in claim 12, wherein the indication of the content metric is generated based on a content distribution channel for distributing the digital content.

15. The system as described in claim 12, wherein the plurality of content components include multiple versions and the indication of the content metric identifies a version of the multiple versions that maximizes a value of the content metric.

16. A non-transitory computer-readable storage medium storing executable instructions, which when executed by a processing device, cause the processing device to perform operations comprising:
    extracting a plurality of content components from an item of digital content, the plurality of content components including text, a digital image, and a layout defined using a markup language;
    generating a plurality of embeddings by processing the plurality of content components using one or more machine learning model;
    combining the plurality of embeddings as concatenated embeddings; and
    generating an indication of a content metric for display in a user interface by processing the concatenated embedding using the one or more machine learning models, the indication indicating a prediction of a level of performance of the item of digital content.

17. The non-transitory computer-readable storage medium as described in claim 16, wherein the operations further comprise reducing dimensionality of the plurality of embeddings using an autoencoder.

18. The non-transitory computer-readable storage medium as described in claim 16, wherein the one or more machine learning models includes at least one of a Bidirectional Encoder Representations from Transformers model, a Contrastive Language-Image Pretraining model, a Long-Document Transformer model, or a multilayer perceptron model.

19. The non-transitory computer-readable storage medium as described in claim 16, wherein the operations further comprise deconfounding the plurality of embeddings using conditional adversarial learning.

20. The non-transitory computer-readable storage medium as described in claim 16, wherein the indication of the content metric indicates at least one of a prediction, a description, a prescription, or a generation.

* * * * *